United States Patent [19]

Baird

[11] 3,819,569

[45] June 25, 1974

[54] AROMATIC POLYAMIDES STABILIZED WITH NICKELOUS CARBONATE

[75] Inventor: Bennett Ray Baird, Camden, S.C.

[73] Assignee: E. I. du Pont de Nemour and Company, Wilmington, Del.

[22] Filed: June 28, 1973

[21] Appl. No.: 374,570

[52] U.S. Cl. ...... 260/45.75 N, 117/161 P, 117/232, 162/160, 162/164, 161/225
[51] Int. Cl. ............................................ C08g 51/56
[58] Field of Search ...... 260/45.75 N, 37 N, 37 NP; 117/161 P, 232; 162/159, 160, 164; 161/225

[56] References Cited
UNITED STATES PATENTS

| | | | |
|---|---|---|---|
| 2,665,265 | 1/1954 | Burgess | 260/45.75 |
| 2,913,348 | 11/1959 | Jackson | 260/45.75 N |
| 3,459,703 | 8/1969 | Briggs et al. | 260/45.75 |
| 3,616,200 | 10/1971 | Reibach | 260/45.75 |
| 3,636,023 | 1/1972 | Murray et al. | 260/45.75 |
| 3,640,761 | 2/1972 | Hamanaka et al. | 260/45.75 |
| 3,755,249 | 8/1973 | Fujita et al. | 260/45.75 N |

FOREIGN PATENTS OR APPLICATIONS

| | | |
|---|---|---|
| 1,280,734 | 7/1972 | Great Britain |

*Primary Examiner*—Hosea E. Taylor
*Assistant Examiner*—V. P. Hoke

[57] ABSTRACT

A composition comprising an aromatic polyamide and nickelous carbonate, which inhibits degradative oxidation of the polyamide. The composition may be shaped, i.e., formed in a fiber, a film, or paper, or the like.

12 Claims, No Drawings

AROMATIC POLYAMIDES STABILIZED WITH NICKELOUS CARBONATE

FIELD OF THE INVENTION

This invention relates to aromatic polyamides having improved stability toward oxidative degradation. More particularly, the invention is directed to aromatic polyamides in contact with an inhibitor effective against their oxidative degradation, and to shaped structures thereof.

BACKGROUND OF THE INVENTION

The fiber-forming, substantially linear, predominately aromatic polyamides as a class (usually referred to hereinafter as "aromatic polyamides") are considered valuable materials for heat-resistant shaped structures because of their generally high melting point and thermal stability. These polyamides are comprised predominately of the repeating structural unit:

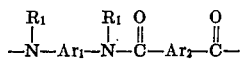

wherein each $R_1$ independently is hydrogen or lower alkyl, and $Ar_1$ and $Ar_2$ are the same or different and are substituted or unsubstituted divalent aromatic radicals in which the chain-extending bonds are attached to nonadjacent carbon atoms in the aromatic rings. By "chain-extending bonds" is meant those bonds which connect $Ar_1$ and $Ar_2$ to nitrogen atoms and carbonyl groups, respectively. Typical substituents include, e.g., lower alkyl, lower alkoxy, halogen, nitro, lower carbalkoxy, or other groups which do not form a polyamide during polymerization. Also comprehended in this class of aromatic polyamides are copolyamides wherein up to about 15 percent of $Ar_1$ and/or $Ar_2$ may be replaced with non-aromatic chain-linking divalent organic groups such as hexamethylene and cyclohexylene.

Although the aromatic polyamides in pure form are generally quite stable when exposed to very high temperatures, e.g., up to 300°C. and even higher, contamination of them with traces of chloride ion causes a severe oxidative degradation problem when the polyamides are contacted with a copper — or iron-containing metal at high temperatures while also being exposed to air containing moisture. These conditions are frequently found in semiclosed electrical systems containing copper, wherein air having a trace of moisture may be present, and an electrical insulative paper made of an aromatic polyamide is being employed as high temperature electrical insulation for the copper. If such a polyamide has been contaminated with chloride ion during production or handling, the combination of air, moisture, chloride ion, heat, and presence of copper initiates oxidative degradation of the polyamide. As this reaction develops, failure of the polyamide takes place rapidly with actual development of holes in the insulation paper.

Avoidance of chloride ion contamination in structures composed of aromatic polyamides is difficult, since the most useful methods for synthesizing the aromatic polyamides and forming them into shaped structures, such as paper, involves presence of chloride. Thus, the aromatic polyamides are readily prepared by reacting diacyl chlorides with diamines with formation of chloride ion as a by-product of the reaction; and the subsequent extrusion of the polyamide is most conveniently carried out by employing a solution of it in an organic solvent having dissolved therein one or more inorganic halide salts. Later, when the polyamide is formed into paper, it may be contaminated by the presence of chlorides in the water used in the paper-making process. Finally, the paper or other shaped structure of the polyamide may be contaminated by perspiration or contact with some other material which contains salt or other source of chloride ion.

The relatively few previously known inhibitors for protecting aromatic polyamides from oxidative degradation suffer from various deficiencies. For instance, when bismuth hydroxide is employed as an inhbitor for poly(m-phenylene isophthalamide), it produces a severe "afterglow" problem. This is a phenomenon in which exposure of the polyamide to a direct flame, followed by removal of the direct flame, leaves a residual incandescence in the polyamide which persists for some time before dying out. Improved and more effective inhibitors against oxidative degradation have, therefore, been desired.

SUMMARY OF THE INVENTION

The present invention provides a composition comprising a fiber-forming, substantially linear, predominately aromatic polyamide in contact with nickelous carbonate in an amount of between about 0.5 –10 percent, preferably about 2–5 percent, based on the weight of the polyamide.

Preferably also, the aromatic polyamide and the nickelous carbonate will be in the form of a shaped article, such as a fiber, paper, or film.

The nickelous carbonate inhibited polyamide compositions of this invention exhibit greatly improved resistance of oxidative degradation caused by the presence of chloride ion at points of contact with copper or iron when exposed at high temperature to air containing moisture. Surprisingly, when a structure formed of the novel composition of the invention is exposed to flame, the "afterglow" observed after removal of the direct flame is also at a low level.

DESCRIPTION OF THE INVENTION

The polymers used in this invention are the fiber-forming, substantially linear, predominately aromatic polyamides described previously. These polymers may be formed by reacting an aromatic diamine, in which the amine groups are attached to nonadjacent carbon atoms, with an aromatic diacid chloride, in which the acid chloride groups are similarly attached to nonadjacent carbon atoms. Suitable diamines for preparation of the aromatic polyamides used in the invention include m-phenylenediamine, lower alkyl substituted m-phenylenediamines such as 4methyl-m-phenylenediamine, alkoxy substituted m-phenylenediamines such as 4-methoxy-m-phenylenediamine, halogen-substituted m-phenylenediamines such as 4-chloro-m-phenylenediamine, p-phenylenediamine and substituted derivatives thereof, 4,4'-diphenyldiamine, 3,3'-diphenyldiamine, and 4,4'sulfonyldiphenyldiamine. Suitable diacid chlorides for preparation of the aromatic polyamides used in the invention include isophthaloyl chloride and lower alkyl isophthaloyl chlorides such as 4-methyl-isophthaloyl chloride, halogen-substituted isophthaloyl chlorides such as 4-chloro-isophthaloyl chloride, terephthaloyl chloride and substituted derivatives thereof, 3,3'-dibenzoyl chloride, and 4,4'-dibenzoyl chloride. Additional diamines and diacid chlorides suitable for preparing the aromatic polyamides used in the invention are disclosed in U.S. Pat. No. 3,063,966 and U.S. Pat. No. 3,094,511, which also disclose detailed procedures for preparing these aromatic polyamides.

Preferably, the recurring units of the aromatic polyamide will consist essentially of the repeating units set forth structurally in the Background section hereof. Most preferably the polyamide will be wholly aromatic. Because of its valuable properties and ease of preparation, poly(m-phenylene isophthalamide) is the preferred polyamide. Another preferred polyamide is poly(p-phenylene terephthalamide), which has exceptionally high thermal stability.

The aromatic polyamides are normally used in the form of shaped structures. The term "shaped structure," as used herein, refers to any article which has been prepared in a form having a previously specified configuration and dimensions and includes filaments, fibers, yarns, woven or knitted fabrics, films, papers, and sheets.

The method employed to form the aromatic polyamides into shaped structures are well known in the art. Many of the aromatic polyamides are advantageously dissolved in an organic solvent having dissolved therein one or more inorganic salts, as described in U.S. Pat. No. 3,068,188. In the case of poly(m-phenylene isophthalamide), a useful solvent combination is dimethylacetamide containing calcium chloride dissolved therein. From such polymer solutions, filaments, may be dry spun and films may be extruded. After extrusion, the filaments or films can be drawn and then extracted with water to remove the residual salt and solvent. The filaments may then be cut to the desired length to form staple fibers or floc (short fibers). Concentrated sulfuric acid is a suitable solvent for many of the aromatic polyamides which are soluble only with difficulty in organic solvents or organic solvent/salt combinations. Thus, poly(p-phenylene terephthalamide) is advantageously wet-spun from a solution in 100 percent sulfuric acid into a bath of dilute sulfuric acid. The filaments and the floc can, of course, be worked into yarn, and the yarn then woven or knitted into fabric.

The aromatic polyamides may also be formed by known methods into fibrids, which are nonrigid particles of high specific surface area capable of forming paper-like structures on a paper-making machine. As described more fully in U.S. Pat. No. 2,988,782, fibrids are readily prepared by adding a solution of a synthetic polymer to a precipitant for the polymer under shear conditions. A specific apparatus for carrying out the precipitation procedure is described in U.S. Pat. No. 3,018,091. Papers of the aromatic polyamides may be formed on conventional paper-making equipment from an aqueous slurry of fibrids and floc prepared separately from the same or different polymers. The paper is then an interfelted web of the fibers and fibrids, bonded by heat and pressure.

In accordance with the present invention, a composition is formed in which the aromatic polyamide material is in contact with nickelous carbonate. The nickelous carbonate acts as an inhibitor when present in an amount sufficient to interact with chloride ion present as an impurity in polymer. The nickelous carbonate may be incorporated in the polymer prior to its extrusion to form filaments, films, or fibrids containing the inhibitor; it may also be mixed with or coated onto the fibers (filaments or staple), films or fibrids of the polymer when they are being formed into a shaped structure; or the final shaped structure may also be impregnated with the nickelous carbonate inhibitor.

The nickelous carbonate inhibitor may be pure nickelous carbonate, or it may be a substance containing nickelous carbonate together with inert substances. Surprisingly, among such inert materials are, e.g., nickelous hydroxide and nickel oxide, for they do not function as inhibitors for the aromatic polyamides. The commercially available grade of hydrated basic nickelous carbonate may be used. An amount of 0.5 percent of nickelous carbonate, or even somewhat less, based on the weight of the polyamide, is sufficient to protect the polyamide from degradation. Amounts in excess of about 10 percent are not necessary. Optimum results are usually obtained with amounts in the range of 2–5 percent.

The following example further illustrates the present invention.

EXAMPLE

Fibrids are prepared from the wholly aromatic polyamide poly(m-phenylene isophthalamide) having an inherent viscosity of 1.5 by feeding a dimethylacetamide solution containing 14 percent of the polyamide and 6.4 percent calcium chloride through the precipitation apparatus described in U.S. Pat. No. 3,018,081, using a dilute aqueous solution of the polymer solvent mixture as a precipitant. The resulting fibrid slurry is passed to a drum filter, upon which the fibrids are collected. The fibrids are further treated by adding 3 liters of a 0.8 percent by weight aqueous slurry of the fibrids to a 4-liter Waring Blender and operating the blender for 1 minute at the high-speed setting.

Floc fiber of 2.0 denier/filament is prepared by dry-spinning a solution of the same polyamide as used above in dimethylacetamide in the conventional manner and cutting the resulting filaments to a length of about 1/4 inch.

Four series of experiments are run, a slurry being prepared in each instance from about 4.5 liters of tap water containing 2.8 grams of fibrid and floc in the weight ratio of 1.5 to 1.0. An inhibitor is then added to each slurry, a different inhibitor being employed in each series of experiments, as follows:

| Series | Inhibitor | Mol Ratio $NiCO_3/Ni(OH)_2/H_2O$ |
|---|---|---|
| A | Hydrated basic $NiCO_3$ | 2.0/1.8/5.0 |
| B | Hydrated basic $NiCO_3$ | 2.0/2.3/6.3 |
| C | Reagent Grade $NiCO_3$ | 1.0/0/0 |
| D | Reagent Grade $Ni(OH)_2$ | 0/1.0/0 |

Various amounts of each inhibitor are added in separate experiments, except that a control is run to which no inhibitor is added. The slurry is then placed in each instance in the slurry chamber of a handsheet mold fitted with a 100-mesh forming screen, having wire with a diameter of 0.011 centimeter, for forming a sheet of 8 by 8 inches (20.3 × 20.3 centimeters). After gentle agitation to assure nominal uniformity of slurry consistency, a valve in a line connecting the enclosed space below the wire with an evacuated white-water receiver is opened. Filtration and sheet formation then occurs under the influence of a positive pressure differential greater than the hydrostatic head. The forming screen containing the wet sheet is removed and placed on a flat surface with the wire side down. Blotting paper is then laid on the sheet and this assembly is compressed by repeated rolling with a 22-pound (10 kilograms) couch roll. This treatment partially dewaters the sheet and strengthens it for removal from the screen. The damp sheet is then placed between two pieces of blotting paper and the assembly placed on a standard curved-plate photographic sheet drier set to a temperature of about 190°C. to 205°C. The sheet is then trimmed to about 7.5 × 7.5 inches (19 × 19 centimeters) to remove any thick edges, redried on the sheet drier at about 127°C. for about 5 minutes, and the hot sheet is then pressed for about 1 minute to a paper between platens at a temperature of about 275°C. under about 1000 lbs./sq. inch pressure. The inhibitor is distributed throughout the paper.

The resulting composition is tested for its resistance to oxidative degradation, as follows.

The paper is trimmed to 4 (10.0 centimeters) by 6 inches (15.2 centimeters). A piece of the same size is cut from 0.00075 inch (0.019 millimeter) thick aluminum foil. A section of the foil is then cut and removed, leaving a hole in the shape of an isosceles triangle five-sixteenths inch (0.79 centimeter) on the base and 3 ⅞ inches (9.8 centimeters) in height centered in the foil with its long dimension colinear with that of the foil piece. The following layered assembly is then prepared, each element of which is centered on the one below:

a. steel plate — 9 inches (22.9 centimeters) square, one-sixteenth inch (0.159 centimeter) thick.

b. aluminum foil — same size as (a), 0.0010 inch (0.025 millimeter) thick.

c. paper sample — trimmed as described above.

d. aluminum foil — trimmed and section removed as described above.

e. copper foil — same size as (c), 0.003 inch (0.076 millimeter) thick.

A number of these assemblies (as many as twelve) are layered vertically into a pile, and the pile is sandwiched between two steel plates 8 inches (20.3 centimeters) square and 0.25 inch (0.63 centimeter) thick. The piles are placed in an air oven maintained at a temperature of 300°C. Periodically piles are removed and the paper examined for holes. The end point is taken as the time required to form one hole in either of two paired pieces, one of which had the "bottom" side (forming wire side) facing the copper, the other of which had the "top" side facing the copper.

The following results are obtained:

| Series | % Inhibitor* | End Point (Days) |
|---|---|---|
| A | 2.6 | 3½ |
|   | 3.6 | 4 |
|   | 4.4 | 9 |
| B | 3.0 | 2 |
|   | 3.7 | 5½ |
|   | 4.3 | 8 |
| C | 2.9 | 4 |
|   | 3.6 | 4 |
| Continued |   |   |
| D | 4.7 | 7 |
|   | 2.8 | ½ |
|   | 3.9 | 1 |
| Control | 4.8 | 1½ |
|   | — | ½ |

*Calculated as NiCO$_3$

The data obtained from this experiment illustrate that the hydrated basic nickelous carbonates of Series A and B and the pure nickelous carbonate of Series C are all effective inhibitors, but that nickelous hydroxide is little more effective than no inhibitor at all. This result is particularly surprising since when the papers of Series A, B, and C are aged in open air at 300°C., their rate of losses in mechanical and electrical properties is essentially equal to that of control paper that contains no inhibitor.

When the NiCO$_3$—containing papers of Series A, B, and C are exposed to flame and the flame is subsequently removed, the afterglow exhibited by the papers persists only about 10 seconds, as contrasted with a 31 second afterglow exhibited by a paper made of the same polymer but having a bismuth hydroxide inhibitor.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A composition comprising a fiber-forming, substantially linear, predominately aromatic polyamide in contact with about 0.5 to about 10 percent nickelous carbonate, based on the weight of the polyamide.

2. The composition of claim 1 wherein the polyamide is poly(m-phenylene isophthalamide) or poly(p-phenylene terephthalamide).

3. The composition of claim 1 wherein the amount of nickelous carbonate is between about 2 and about 5 percent, based on the weight of the polyamide.

4. The composition of claim 2 wherein the amount of nickelous carbonate is between about 2 and about 5 percent, based on the weight of the polyamide.

5. The composition of claim 4 wherein the aromatic polyamide is wholly aromatic.

6. The composition of claim 1 in the fibrid form.

7. The composition of claim 1 in fiber form.

8. A paper comprising the composition of claim 1.

9. A fabric comprising the composition of claim 1.

10. A paper comprising the composition of claim 2.

11. A fabric comprising the composition of claim 2.

12. The paper of claim 10 wherein the polyamide is poly(m-phenylene isophthalamide).

* * * * *